Figure 1:
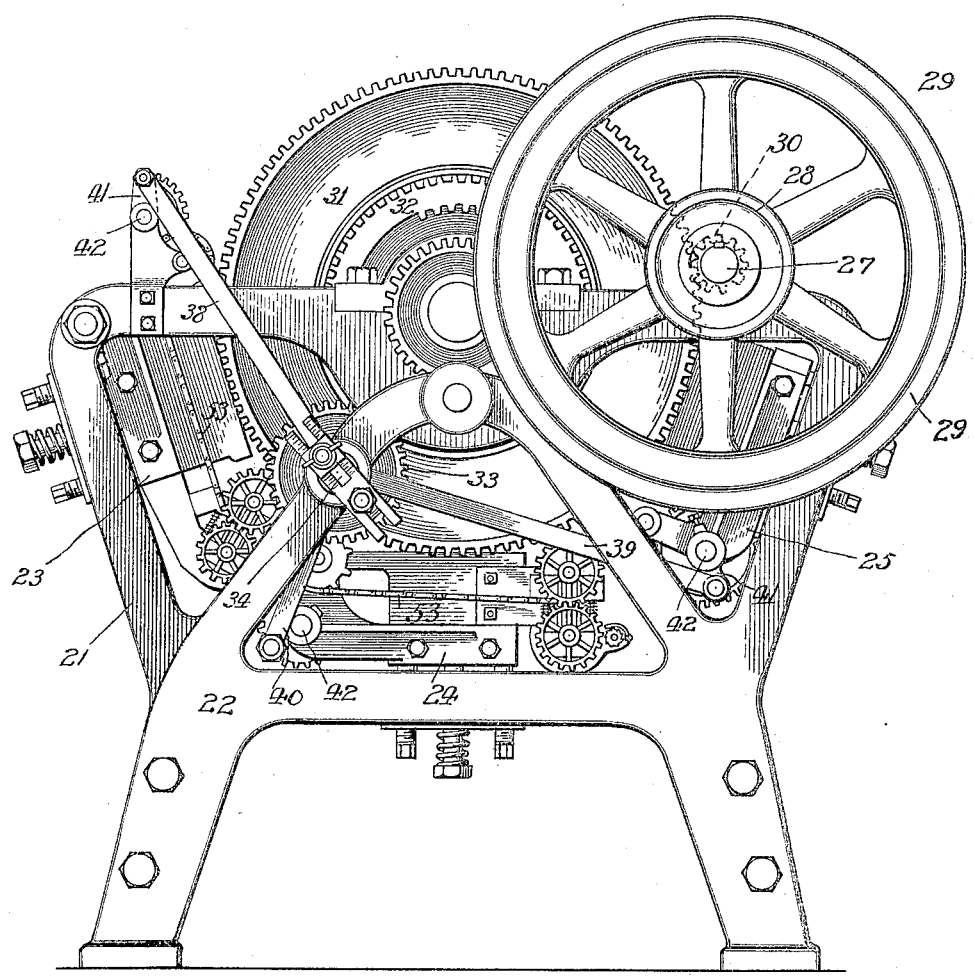

No. 813,125. PATENTED FEB. 20, 1906.
C. WILLIAMS.
INKING MECHANISM FOR PRESSES.
APPLICATION FILED APR. 1, 1903.

7 SHEETS—SHEET 1.

Witnesses:
Howard G. Barrett
E. Molitor

Inventor
Charles Williams
By Coburn & McRoberts
Attys.

No. 813,125. PATENTED FEB. 20, 1906.
C. WILLIAMS.
INKING MECHANISM FOR PRESSES.
APPLICATION FILED APR. 1, 1903.

7 SHEETS—SHEET 2.

Witnesses:
Harold G. Barrett
E. Molitor

Inventor
Charles Williams
By Coburn & McRoberts
Atty's

No. 813,125. PATENTED FEB. 20, 1906.
C. WILLIAMS.
INKING MECHANISM FOR PRESSES.
APPLICATION FILED APR. 1, 1903.
7 SHEETS—SHEET 3.
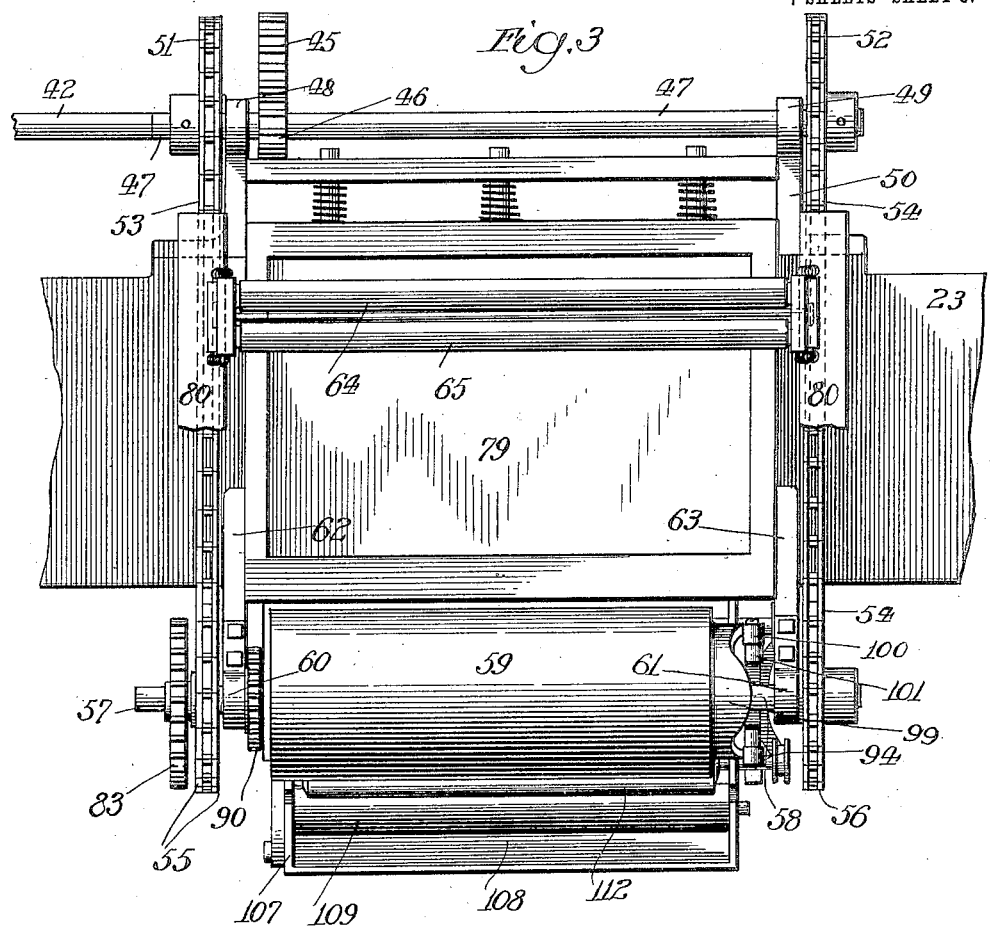
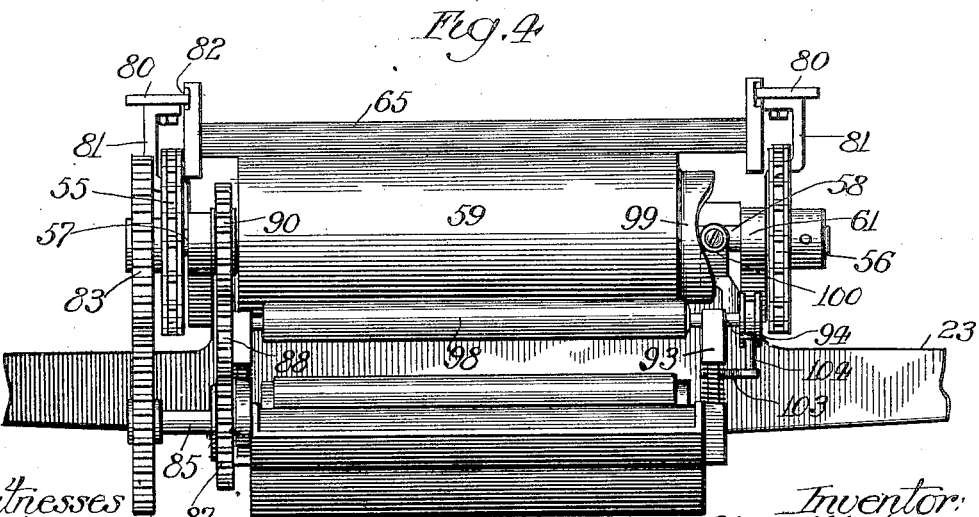

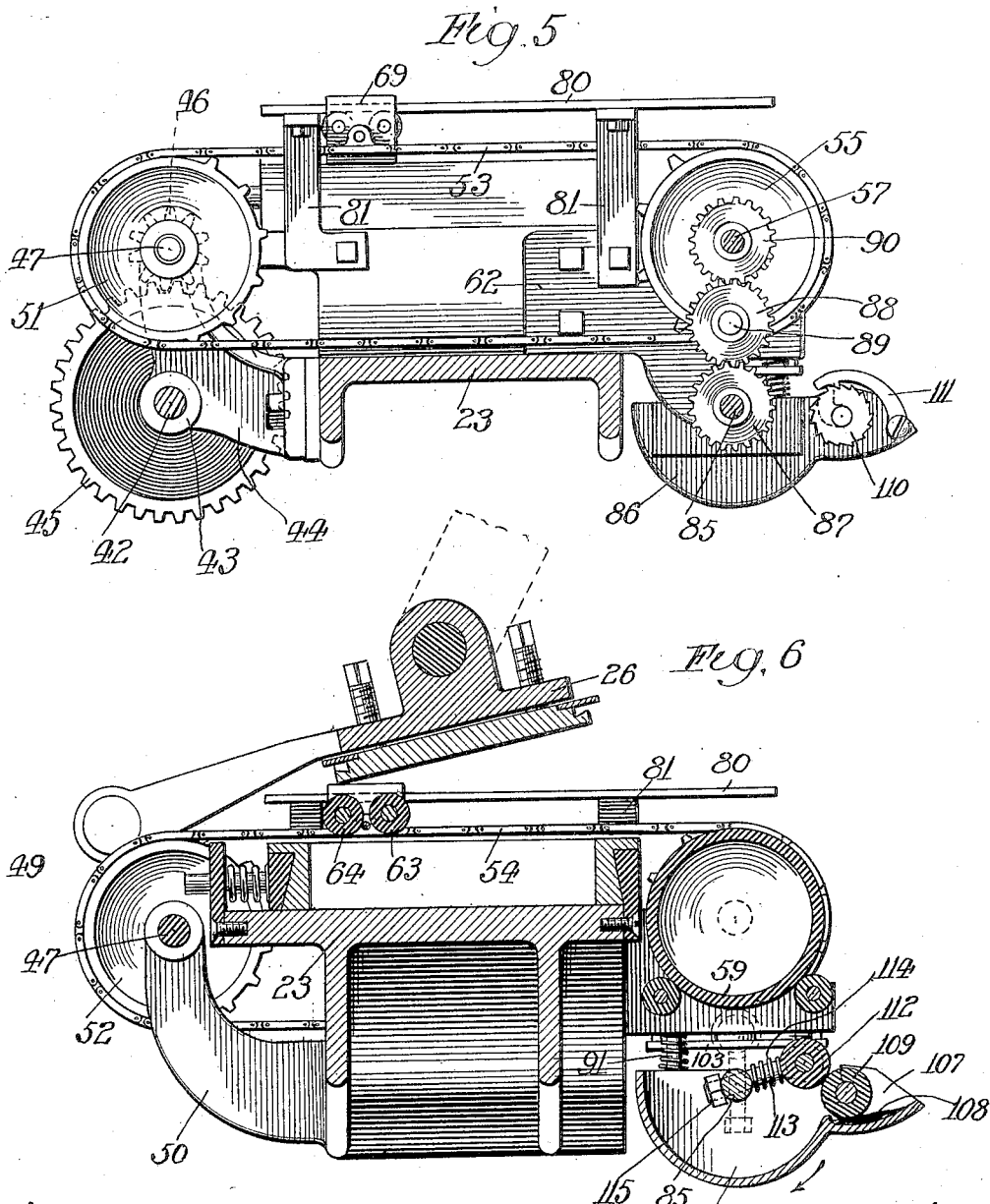

No. 813,125. PATENTED FEB. 20, 1906.
C. WILLIAMS.
INKING MECHANISM FOR PRESSES.
APPLICATION FILED APR. 1, 1903.

7 SHEETS—SHEET 5.

Witnesses:
Harold J. Barrett
E. Molton

Inventor:
Charles Williams
by Coburn & McRoberts
Attys.

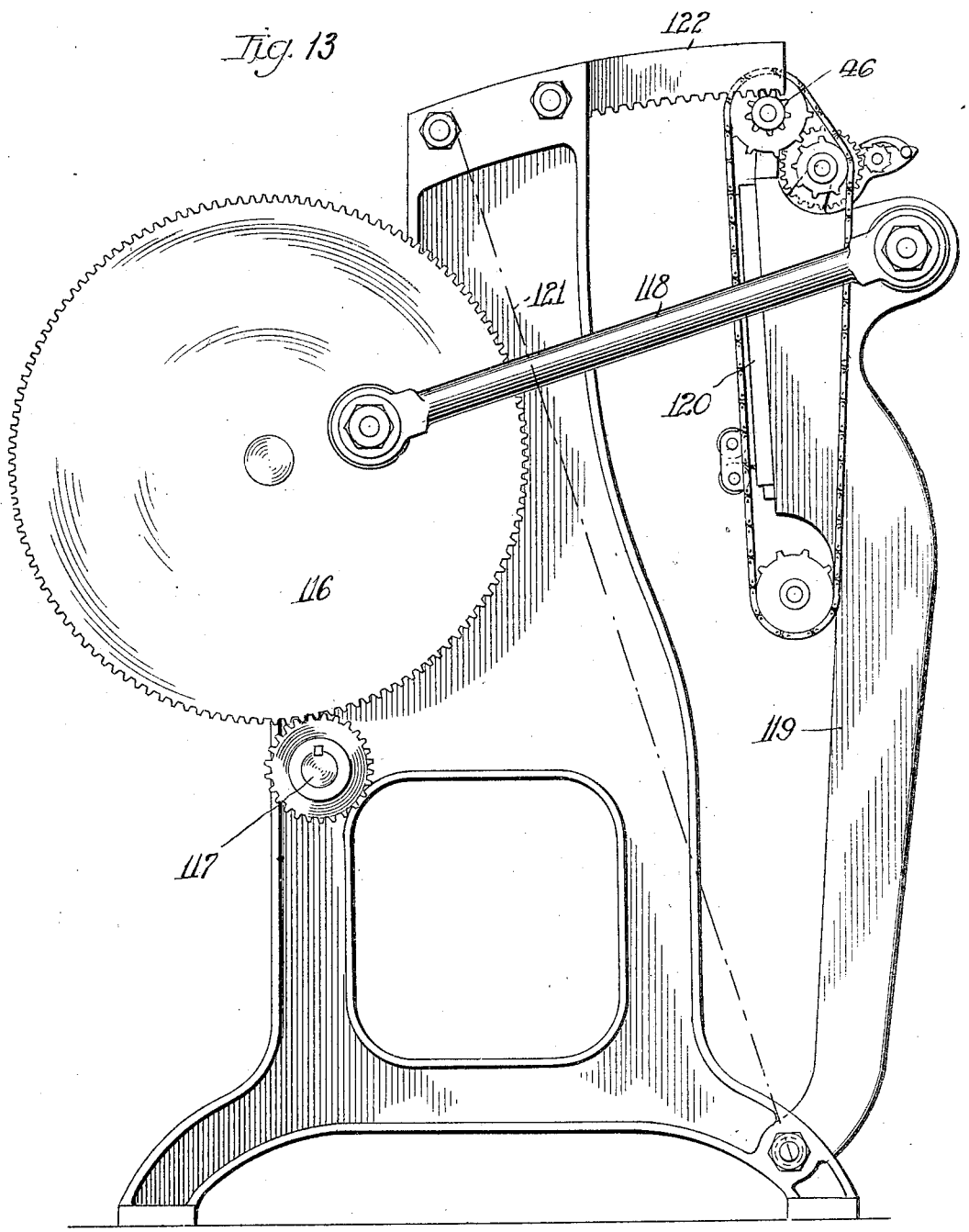

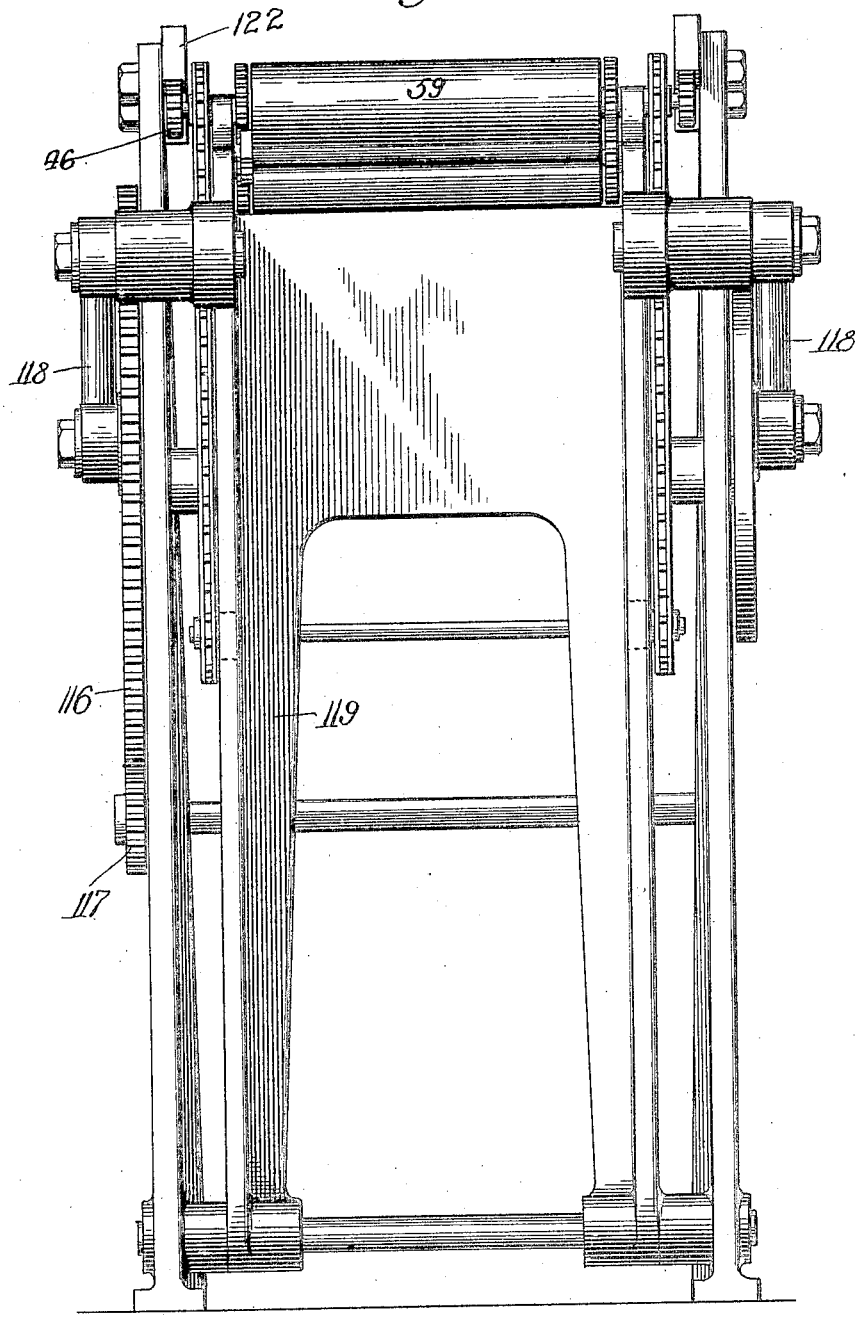

UNITED STATES PATENT OFFICE.

CHARLES WILLIAMS, OF SPOKANE, WASHINGTON, ASSIGNOR OF SEVEN-EIGHTHS TO WILLIAM H. COWLES AND JOHN F. YOUNG, OF SPOKANE, WASHINGTON.

INKING MECHANISM FOR PRESSES.

No. 813,125.     Specification of Letters Patent.     Patented Feb. 20, 1906.

Application filed April 1, 1903. Serial No. 150,566.

*To all whom it may concern:*

Be it known that I, CHARLES WILLIAMS, a citizen of the United States, residing at Spokane, in the county of Spokane and State of Washington, have invented certain new and useful Improvements in Inking Mechanisms for Presses, of which the following is a specification.

My present invention is concerned with a novel inking mechanism, which I have devised, primarily, for use in connection with my multicolor-press, for which I have made application for Letters Patent of the United States, Serial No. 150,563, filed April 1, 1903, but which adapts itself with equal facility to other forms of presses.

To illustrate my invention, I annex hereto seven sheets of drawings, in which the same reference characters are used to designate identical parts in all the figures, of which—

Figure 2:
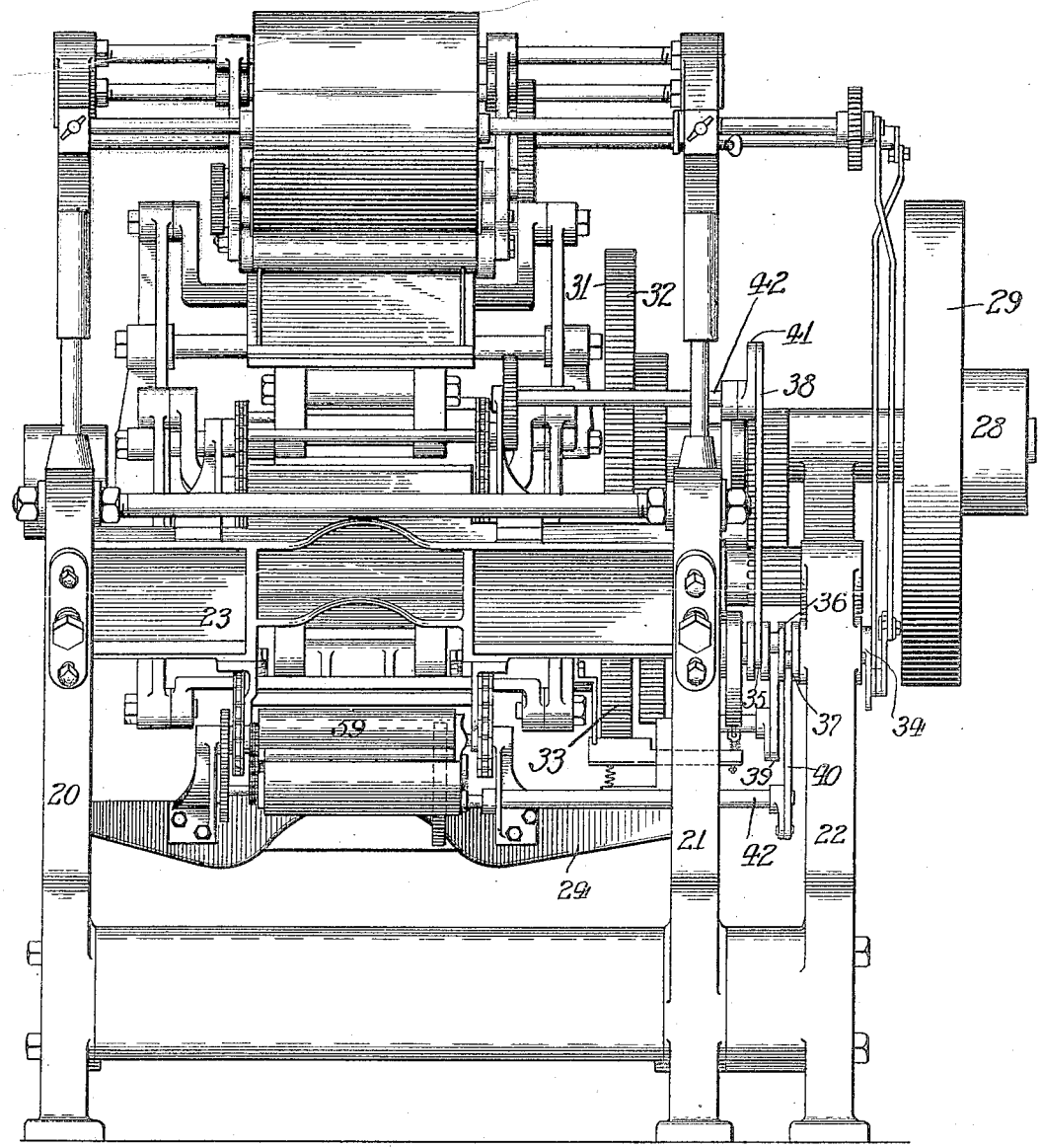
Figure 7:
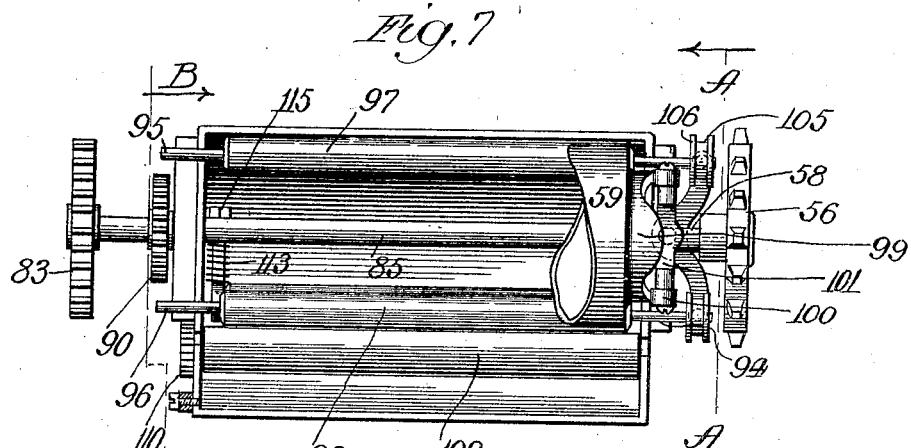
Figures 8, 9:
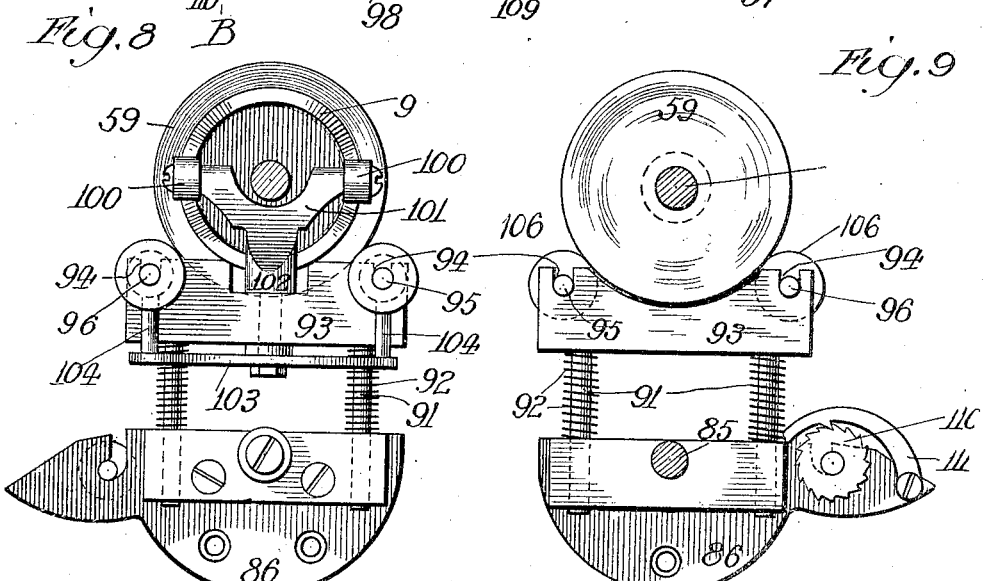
Figures 10, 11:
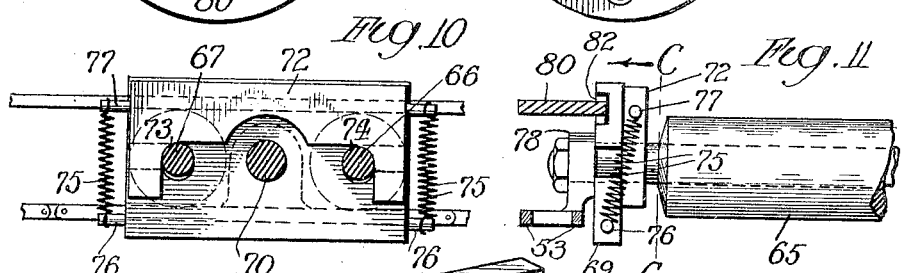
Figure 12:
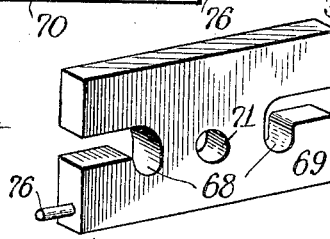

Figure 1 is a side elevation of my aforesaid multicolor-press, showing the inking mechanism applied thereto. Fig. 2 is a rear elevation of said press. Fig. 3 is a top plan view of one of the inking mechanisms, on an enlarged scale and with a portion of the guiding-brackets broken away. Fig. 4 is an end elevation of the same from the ink-supplying end. Fig. 5 is a side elevation. Fig. 6 is a central longitudinal section. Fig. 7 is a top plan view of the ink-well and its associated parts with portions of the main distributing-roller broken away. Fig. 8 is an end view of the mechanism shown in Fig. 7 in section on the line A A of said figure. Fig. 9 is a similar view of the other end, in vertical section, on the line B B of Fig. 7. Fig. 10 is a detail of the traveling inking-rollers as seen in section on the line C C of Fig. 11. Fig. 11 is a side elevation of one end of the traveling inking-rollers. Fig. 12 is a perspective view of one member of the mechanism shown in Figs. 10 and 11. Fig. 13 is a side elevation of a Gordon press, showing my improved inking mechanism applied thereto; and Fig. 14 is an end elevation of the same.

In the aforesaid multicolor-press in the form illustrated in said application I employ three standards 20, 21, and 22, suitably connected to support all the working parts, and between the standards 20 and 21 I secure three transverse type-bed plates 23, 24, and 25, which carry the customary type-forms, from which impressions are taken in order by a series of intermittently-rotating platens, one of which is shown in section in Fig. 6 at 26. In connection with each of these type beds and forms I employ an inking mechanism (shown in detail in Figs. 3 to 12) which I will now describe after indicating how said mechanisms are driven. In the brackets 21 and 22 is mounted a shaft 27, carrying the belt-wheel 28 and preferably the fly-wheel 29 and having on its inner end a gear-pinion 30, which meshes with the toothed periphery of the driving-disk 31, which has projecting therefrom an exteriorly-toothed flange 32, whose teeth engage a gear-wheel 33 of half the diameter, secured upon a shaft 34, mounted in suitable bearings formed in the standards 21 and 22. As seen in Fig. 2, the shaft 34 has three eccentric portions 35, 36, and 37, upon which are pivotally secured the links 38, 39, and 40, respectively, each of which rocks an arm 41, secured upon a shaft 42, in connection with its inking mechanism through a considerable arc twice each rotation of the driving-wheel 31, which corresponds in frequency to the presentation of the succeeding platens to the type-forms.

Referring now to the details shown in Figs. 3 to 12, the shaft 42 is journaled in a suitable bearing 43, formed in the bracket 44, secured to one end of the type-bed plate 23, 24, or 25, as the case may be. This shaft 42 has rigidly secured thereon a gear-wheel 45, which meshes with the gear-pinion 46, secured on the shaft 47, mounted at one end in a suitable bearing formed in the bracket 44 above the bearing 43 and at the other end in a similar bearing 49, formed in the bracket 50, similar to the bracket 44 and projecting from the bed-plate 23. The shaft 47 has at its ends the sprocket-wheels 51 and 52, with which coöperate the sprocket-chains 53 and 54, said sprocket-chains also passing over the sprocket-wheels 55 and 56, respectively, which are loosely mounted on the stub-shafts 57 and 58, projecting from the ends of the inking-cylinder 59 and journaled in suitable bearings 60 and 61, formed in the brackets 62 and 63, secured to the top bed-plate 23 or some stationary associated part. It will be apparent that the rocking of the shaft 42 through a considerable angle will, through the intermediate gear mechanism, cause the chains 53 and 54 to be reciprocated a considerable distance at each operation of the machine, and this distance is sufficient to carry a pair of traveling inking-rollers over the type-form and around and in connection with the inking-cylinder 59, so that at each operation the form is inked and an additional supply of ink is secured by the traveling inking-rollers. These inking-rollers 64 and 65, as best shown in Figs. 10 to 12, are mounted on shafts 66 and 67, the ends of which are journaled in the L-shaped bearing-recesses 68, (best shown in Fig. 12,) formed in the plates 69, which plates are firmly connected by the extension-rod 70, secured in the aperture 71 in each plate, as well as by the rollers, thus forming a carriage for said rollers. To hold the ends of the rollers down in their bearings 68 with a yielding tension, I employ in connection with each of the plates 69 a coöperating plate 72, the shape of which is shown in Fig. 10 and which has the two bearing-surfaces 73 and 74, adapted to rest on and coöperate with the ends of the shafts 66 and 67 and hold them down with the proper yielding tension, which is furnished by the helically-coiled contractile springs 75 at each end, which engage with the pins 76, projecting from the bottom of the block 69, and with the pins 77, projecting from the top of the plate 72. By the employment of this mechanism it will be seen that I secure a steady and constant downward tension on the rollers 64 and 65, which serves to bring them in proper yielding contact with the type-forms. The rods 70 have secured to their ends the brackets 78, by which the traveling rollers and their frame are secured to the chains 53 and 54. To guide these rollers as they are passing over the type-form 79, I employ the guide-plates 80 at each end, which are supported by suitable brackets 81 from the bed-plate 23. Upon the outer side of the block 69 I form the groove 82, the outer end of which is flared slightly, as best shown in Fig. 11, to insure the blocks engaging the guides 80 properly.

To rotate the inking-cylinder 59, I employ the intermediate gear mechanism shown in Figs. 4 and 5, for the reason that if the cylinder were rotated directly from the movement of the sprocket wheels and chains it would be moving in the same direction as the inking-rollers 64 and 65 when they pass over it and return, and consequently though there might be a different rate of movement, yet the amount of surface of the cylinder 59 that would be traversed by the inking-rollers 64 and 65 would be comparatively slight, and the inking-rollers would not receive as substantial a coat of ink as is desired. For this reason I interpose gearing which causes the inking-cylinder 59 to rotate in the opposite direction to that in which the inking-rollers 64 and 65 are moving, thus insuring an ample distribution of ink from the cylinder 59 upon the rollers 64 and 65. This gearing consists of the pinion 83, secured on the outer end of the shaft 57 and meshing with a companion gear 84, secured on a shaft 85, journaled in suitable bearings formed in the ends of the distributing-concave 86. Secured on this shaft 85 a little inside of the gear-wheel 84 is a smaller gear-wheel 87, (see Fig. 5,) which meshes with an idle gear 88, mounted on a suitable stub-shaft 89 and in turn meshing with a gear 90, secured to the inking-cylinder 59. By the interposition of the idle pinion 88 it will be apparent that the inking-cylinder 59 will rotate in the opposite direction from the movement of the inking-rollers 64 and 65.

Referring now especially to Figs. 6 to 9, it will be seen that there are a pair of vertical rods 91 projecting upward from each end of the distributing-concave 86 and that these rods are surrounded by the helically-coiled expanding springs 92, upon the outer ends of which rest the bearing-plates 93, which have the recesses 94 in the upper edges near the corners, in which rest the ends of the shafts 95 and 96, to which are secured the distributing-rollers 97 and 98. This mounting insures the distributing-rollers being held upward against the inking-cylinder 59 with a yielding pressure sufficient to cause them to be rotated by contact therewith when it is moving and serves to distribute the ink which is placed upon the cylinder. To aid in this distribution, I provide means for reciprocating the distributing-rollers 97 and 98 longitudinally at the same time that they are rotating, and for this purpose I form on one end of the inking-cylinder 59 a cam-track 99, which is provided with three equidistant projections separated by corresponding depressions, and to coöperate with this cam-track I provide a pair of antifriction-rollers 100, mounted upon the horizontal ends of the arms of the yoke 101, formed on the vertical shaft 102, pivotally mounted in a suitable bearing formed in the adjacent plate 93, and provided at its bottom with the transverse plate 103, from which projects upwardly a pair of pins 104, which take into the annular grooves 105, formed in the disks 106, terminating the shafts 95 and 96. With this mechanism it will be apparent that as the inking-cylinder 59 rotates the distributing-cylinders 97 and 98 will not only be compelled to rotate therewith, but will be given a reciprocating longitudinal movement which serves to assist in the distribution of the ink on the cylinder 59.

The distributing-concave 86, which is supported at its ends from the type-bed plate 23 by mechanism not shown, but which may be of any desired form, consists of the main semicylindrical portion, on one side of which is formed the trough 107. As best seen in Fig. 6, the ink 108 is placed in this trough, where it is engaged by the fountain-roller 109, which is journaled in suitable bearings formed in the ends of the trough and is provided at one end with a ratchet 110, with which coöperates a stop-pawl 111 to prevent its reversal, as it is necessary to compel it to move always in one direction in order that it may furnish ink to the roller 112, which is journaled in bearings formed in the ends of the rods 113, which slide in correspondingly-shaped recesses passing transversely through the ends of the shaft 85. Helically-coiled expanding springs 114, interposed between the roller 112 and the shaft 85 and surounding the rods 113, hold the roller 112 yieldingly in its outermost position, which is determined by the lock-nuts 115, placed on the ends of the rods 113. It will be apparent that as the shaft 85 is rotated in one direction by the operation of the gear mechanism previously described it will, beginning with the position in Fig. 6, first strike the fountain-roller 109 and take therefrom a portion of the ink. As its rotation in that direction continues it will pass through an angle of about one hundred and ninety degrees, during which time the roller is in contact with the semicylindrical distributing-concave 86, which contact causes the ink to be distributed over the entire face of the roller, which in its continued movement comes in contact with the under surface of the inking-cylinder 59 and supplies it with the necessary ink, which is distributed by its rollers upon said cylinder, so that the thick ink with which the trough 107 is supplied is by the time it reaches the inking-cylinder 59 thoroughly thinned and distributed, so that it is ready to be taken up by the inking-rollers 64 and 65 and applied to the type-forms. As the shaft 85 is rotated backward in the opposite direction the operation is reversed, except that the roller 109 is not moved, being held by the dog 111, coöperating with the ratchet 110.

In Figs. 13 and 14 I have shown how my improved inking apparatus may be applied to a Gordon press, and it will be found equally adaptable to and fitted for other similar presses. With this style of press the continued rotation of the disks 116 by the driving-shaft 117 through the eccentrically-mounted link 118 serves to swing the frame 119, carrying the type-form 120, forward against a platen, the position of which is indicated at 121 by the broken line. The inking mechanism which I have previously described I have here shown as mounted upon the frame 119 in position to be reciprocated back and forth over the type-form and the inking-cylinder. To actuate the inking mechanism at each printing movement, I provide the pair of racks 122, projecting forward from the top of the stationary framework and engaging directly with the pinion 46 of the structure previously described. This rack 122 may be made of sufficient length so as to enable me to omit the intermediate gear-wheel 45 shown in the other form. As will be seen, I actuate the mechanism from the ink-pot and make some other changes permitted by the change in the location of the parts.

While I have shown and described my invention as embodied in the form which I at present consider best adapted to carry out its purposes, it will be understood that it is capable of modifications and that I do not desire to be limited in the interpretation of the following claims except as may be necessitated by the state of the prior art.

What I claim as new, and desire to secure by Letters Patent of the United States, is—

1. In an inking mechanism, the combination with a type-bed, inking-cylinder, and means for supplying said cylinder with ink, of sprocket-wheels mounted at the sides and ends of said type-bed, a pair of sprocket-chains coöperating with said wheels and moving parallel to the type-bed and around said cylinder during a portion of their course, and inking-rollers mounted in a carriage secured at its ends to said sprocket-chains.

2. In an inking mechanism, the combination with a type-bed, inking-cylinder, and means for supplying said cylinder with ink, of sprocket-wheels mounted at the sides and ends of said type-bed, a pair of sprocket-chains coöperating with said wheels and moving parallel to the type-bed and around said cylinder during a portion of their course, inking-rollers mounted in a carriage secured at its ends to said sprocket-chains, and guides parallel to the type-bed with which the inking-roller carriage coöperates as it is reciprocating over the type-bed.

3. In an inking mechanism, the combination with a type-bed, of an inking-cylinder located adjacent one end thereof, inking-rollers adapted to reciprocate over said type-bed and around said inking-cylinder, and means for reciprocating said inking-rollers and for rotating the inking-cylinder in the opposite direction to the forward movement of the inking-rollers when in contact therewith.

4. In an inking mechanism, the combination with a type-bed, of a shaft mounted to rotate at one end thereof, a pair of sprocket-wheels secured on said shaft, an inking-cylinder shaft mounted parallel to the first-mentioned shaft at the other end of the type-bed, an inking-cylinder on said shaft, a pair of sprocket-wheels loosely mounted on the ends of the inking-cylinder shaft, a pair of sprocket-chains coöperating with said sprocket-wheels, inking-rollers mounted in a carriage secured to said sprocket-chains and reciprocated thereby over the type-bed and about the inking-cylinder, and gear mechanism between said sprocket-wheels and the inking-cylinder to cause the latter to rotate in the opposite direction to the movement of the inking-rollers when they are in contact therewith.

5. In an inking mechanism, the combination with the inking-cylinder, of the semi-cylindrical distributing-concave mounted parallel thereto, a shaft adapted to rock in bearings formed concentrically with the distributing-concave, a distributing-roller carried by and mounted eccentrically on said shaft, an ink-trough, an inking-roller, a ratchet secured to said inking-roller and a dog coöperating therewith to prevent its movement in but one direction, and means for rocking said shaft to cause the distributing-roller to first take ink from the inking-roller, then distribute it over the concave, finally apply it to the surface of the inking-cylinder, and then to reverse its movements to bring it back to the inking-roller.

6. In an inking mechanism, the combination with the inking-cylinder, of a pair of distributing-rollers beneath and coöperating therewith, a spring-pressed frame to hold said rollers in contact with the cylinder with a uniform pressure, and means for reciprocating the rollers longitudinally of the cylinder and independently of the frame.

7. In an inking mechanism, the combination with an inking-cylinder, of an ink-trough located beneath said cylinder and parallel thereto, a pair of distributing-rollers constantly engaging the surface of the inking-cylinder, a frame carrying said distributing-rollers, and helically-coiled expanding springs interposed between said ink-trough and said frame to hold the distributing-rollers in contact with the inking-cylinder.

8. In a device of the class described, the combination with a plurality of type-beds, of an inking mechanism for each consisting of a roller adapted to reciprocate over the bed, a reciprocating chain to which the roller is connected, a rotating shaft, and connections between said shaft, and chains for actuating the inking mechanisms simultaneously during the rotation of said shaft.

9. In a device of the class described, the combination with a plurality of type-beds, of an inking mechanism for each, a rotating shaft, and connections between said shaft and mechanism for actuating them simultaneously during the rotation of said shaft consisting of a rock-shaft connected to each inking mechanism, a link connected to each rock-shaft, and an eccentric on the rotating shaft for each link properly located so that the rock-shafts are operated simultaneously.

10. In a device of the class described, the combination with a plurality of type-beds, of an inking mechanism for each consisting of rollers adapted to reciprocate over the bed, a reciprocating chain to which the rollers are connected, a rock-shaft for each inking mechanism, connections between each rock-shaft and chain for reciprocating the chain as the shaft is rocked, a rotating shaft, and connections between said rotating shaft and the rock-shafts for actuating the inking mechanisms simultaneously during the rotation of said shaft.

11. In an inking mechanism, the combination with an inking-cylinder and means for rotating the same, of a frame carrying a pair of distributing-rollers in contact with the inking-cylinder, and means for reciprocating said rollers longitudinally of the cylinder consisting of a cam-track on the end of the cylinder, a pivoted yoke the arms of which coöperate with the said track, and arms on said yoke engaging with the ends of the distributing-rollers.

12. In an inking mechanism, the combination with an inking-cylinder and means for rotating the same, of a frame carrying a pair of distributing-rollers in contact with the inking-cylinder, and means for reciprocating said rollers longitudinally of the cylinder consisting of a cam-track on the end of the inking-cylinder, a yoke mounted to rock on a vertical axis and having arms coöperating with said cam-track, another pair of arms provided with pins projecting therefrom, and grooved disks on the ends of the distributing-rollers with which said pins coöperate so that the swinging movement of the yoke is imparted in the form of a longitudinal reciprocation to the distributing-rollers.

13. In an inking mechanism, the combination with a pair of inking-rollers, of a carriage for said rollers, and means for holding said rollers under suitable tension for engagement with the type, said means consisting of a plate secured to the carriage at each end of the rollers and having the elongated vertical bearings 68 for the ends of said rollers, the bearing-plates 72 having the bearing-surfaces engaging the tops of said roller-shafts, and the springs pulling said plates together; substantially as and for the purpose described.

In testimony whereof I affix my signature in presence of two witnesses.

CHARLES WILLIAMS.

Witnesses:
E. MOLITOR,
J. McROBERTS.